United States Patent [19]
Lee et al.

[11] Patent Number: 5,581,389
[45] Date of Patent: Dec. 3, 1996

[54] LIGHT FREQUENCY CONTROL APPARATUS

[75] Inventors: Tekken Lee; Nobunari Takeuchi; Haruyoshi Uchiyama, all of Tokyo; Kaoru Shimizu; Tsuneo Horiguchi, both of Mito; Yahei Koyamada, Tokyo, all of Japan

[73] Assignees: Ando Electric Co., Ltd.; Nippon Telegraph and Telephone Corporation, both of Tokyo, Japan

[21] Appl. No.: 364,204

[22] Filed: Dec. 27, 1994

[30]  Foreign Application Priority Data

Dec. 28, 1993 [JP] Japan ................... 5-338667

[51] Int. Cl.⁶ ..................... H04B 10/00; H04J 14/06
[52] U.S. Cl. .................. 359/156; 359/122; 359/124
[58] Field of Search .......................... 359/122, 124, 359/128, 156, 161, 182, 194

[56]  References Cited

U.S. PATENT DOCUMENTS 4,879,763  11/1989  Wood ....................... 359/156

OTHER PUBLICATIONS

K. Shimizu et al., "Frequency-Difference Stabilization of Distributed-feedback laser diodes by use of an optical frequency translation circuit," Optics Letters, vol. 18, No. 21, pp. 1819–1820 (Nov. 1, 1993).

Primary Examiner—Wellington Chin
Assistant Examiner—Kinfe-Michael Negash
Attorney, Agent, or Firm—Finnegan, Henderson, Farabow, Garrett & Dunner, L.L.P.

[57]  ABSTRACT

The present invention provides light frequency control apparatus comprising a light pulse signal generating mechanism for generating a light pulse signal of a standard frequency; a light frequency shifting mechanism for circulating this light pulse signal a predetermined number of times, delaying this light pulse signal at each cycle thereby sequentially shifting and outputting the aforementioned light pulse signal; an extracting mechanism for extracting a light pulse signal in the second half of a cycle from the output of the light frequency shifting mechanism; and a polarization control mechanism inserted into the light frequency shifting mechanism for controlling the angle of polarization of the light pulse signal circulating in the light frequency shifting mechanism based on the amount of attenuation of the light pulse signal outputted by the extracting mechanism.

2 Claims, 5 Drawing Sheets

LIGHT FREQUENCY CONTROL APPARATUS

BACKGROUND OF THE INVENTION

1. Field of the Invention

The present invention relates to a light frequency control apparatus which is ideal for use, for example, in a frequency multiplex transmission system.

2. Relevant Art

In recent years, light frequency control devices for generating CW (continuous) light of a predetermined light frequency have been widely developed. A structural example of this type of device is shown in FIG. 6. As shown in this figure, a standard frequency light source 10 for outputting CW light possessing a light frequency fixed at a predetermined value; light switch 11 for converting CW light supplied from standard frequency light source 10 into a light pulse signal 11a; light frequency shifter 12 for shifting and outputting a light pulse signal 11a supplied from light switch 11; and timing control circuit 13 for respectively supplying a timing signal 13a to light switch 11, and a timing signal 13b to light frequency shifter 12, are respectively provided.

In light frequency shifter 12, a light coupler 12a for introducing light pulse signal 11a inputted via light switch 11 into EDFA 12b, and for inputting a feedback light signal supplied from frequency shifter 12f (to be explained hereafter) into EDFA 12b; EDFA 12b (erbium addition optical fiber amplifier) for amplifying a light pulse signal supplied from light coupler 12a; BPF 12c (band passing filter) for cutting out ASE (spontaneous light emission) of the light pulse signal supplied from EDFA 12b; light coupler 12d for outputting a light pulse signal outputted from EDFA 12b as light signal 103a (light pulse sequence), and for supplying a portion of this light pulse signal to delay fiber 12e; delay fiber 12e for delaying a light pulse signal for a predetermined delay period; and frequency shifter 12f for shifting the frequency of a light pulse signal, and supplying this resultant signal to light coupler 12a as a feedback light signal, are respectively provided.

According to this structure, light frequency shifter 12 outputs, at regular time intervals, a light signal 103a (light pulse sequence) in which the light frequency component is shifted to form a staircase state. Further details regarding this light frequency shifter 12 are disclosed in Shimizu, Kaoru, et al. ("Technique for translating light-wave frequency by using an optical ring circuit containing a frequency shifter"; OPTICS LETTERS, Vol. 17, No. 18: Sep. 15, 1992).

However, in this conventional light frequency control apparatus, in contrast to the high coherence displayed therein, light frequency shifter 12 exhibits a strong polarization dependency due to the polarization dependency possessed by delay fiber 12e, frequency shifter 12f, EDFA 12b and BPF 12c. Consequently, in light coupler 12a, when the inputted light pulse signal 11a and the feedback light signal circulating in the light frequency shifter are coupled, problems arise such as a reduction in the number of cycles due to a deterioration of the S/N ratio of the light signal.

SUMMARY OF THE INVENTION

In consideration of the aforementioned problems, it is an object of the present invention to provide a light frequency control apparatus which can increase the number of cycles of a light signal by reducing the polarization dependency of the light frequency shifter to produce a stable light signal.

In order to achieve this object, the present invention provides light frequency control apparatus comprising:
 light pulse signal generating means for generating a light pulse signal of a standard frequency;
 light frequency shifting means for circulating said light pulse signal a predetermined number of times and delaying said light pulse signal at each cycle, thereby sequentially shifting and outputting said light pulse signal;
 extracting means for extracting a light pulse signal in the second half of a cycle from said output of said light frequency shifting means; and
 polarization control means inserted into said light frequency shifting means for controlling the angle of polarization of said light pulse signal circulating in said light frequency shifting means based on the amount of attenuation of said light pulse signal outputted by means of said extracting means.

According to the structure of the present invention, a light pulse signal in the second half of a cycle is extracted from the output of the light frequency shifting means by means of an extracting means. The polarization state of a light pulse signal circulating in the light frequency shifting means is controlled based on the attenuation amount of the aforementioned outputted light pulse signal by means of a polarizing means. In this manner, it is possible to prevent deterioration of the S/N ratio of the light pulse signal in the light frequency shifting means.

DETAILED DESCRIPTION OF THE PREFERRED EMBODIMENTS

Figure 1:
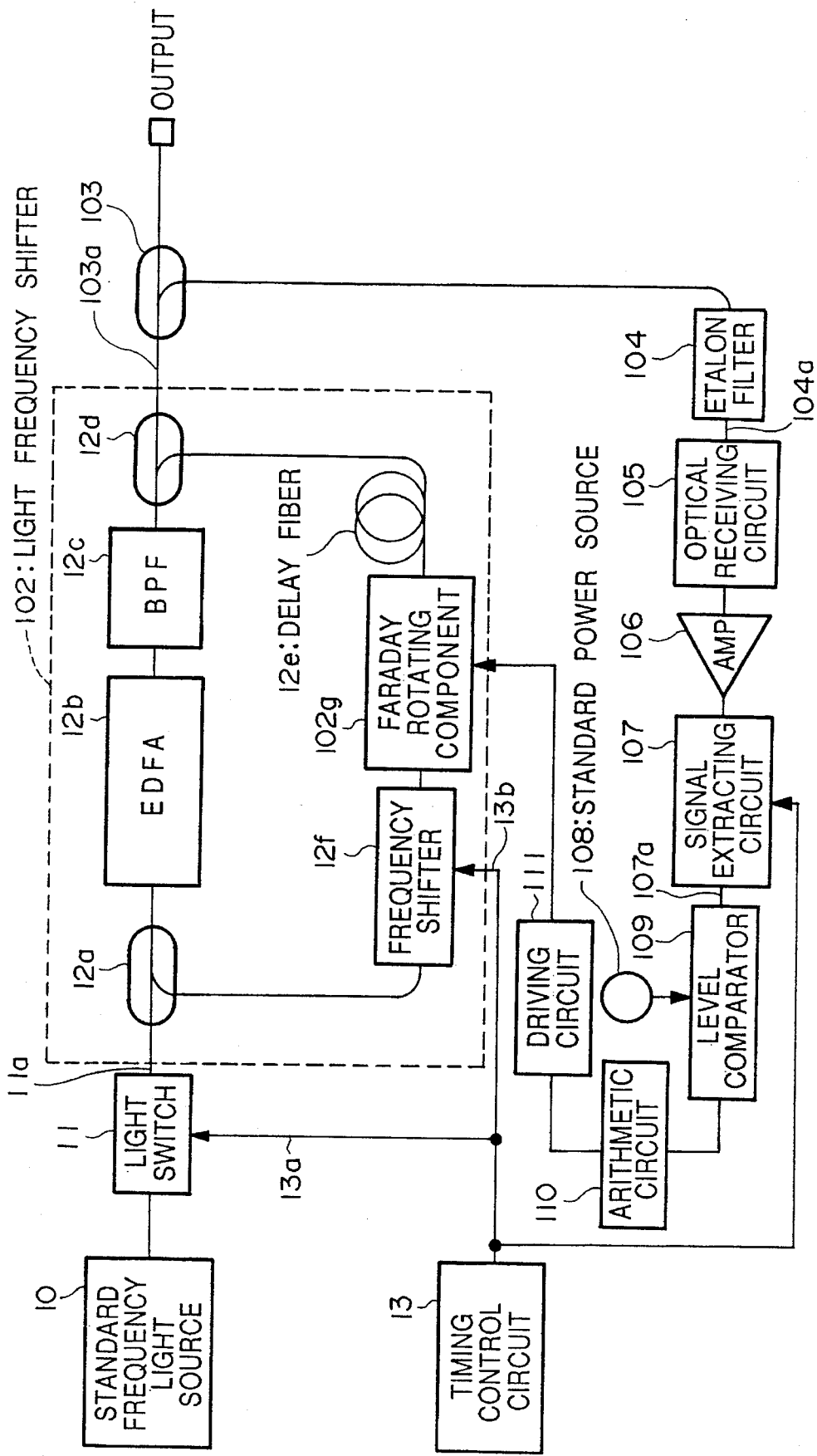
FIG. 1 is a block diagram showing a construction of a light frequency control apparatus according to a first embodiment of the present invention.
Figure 6:
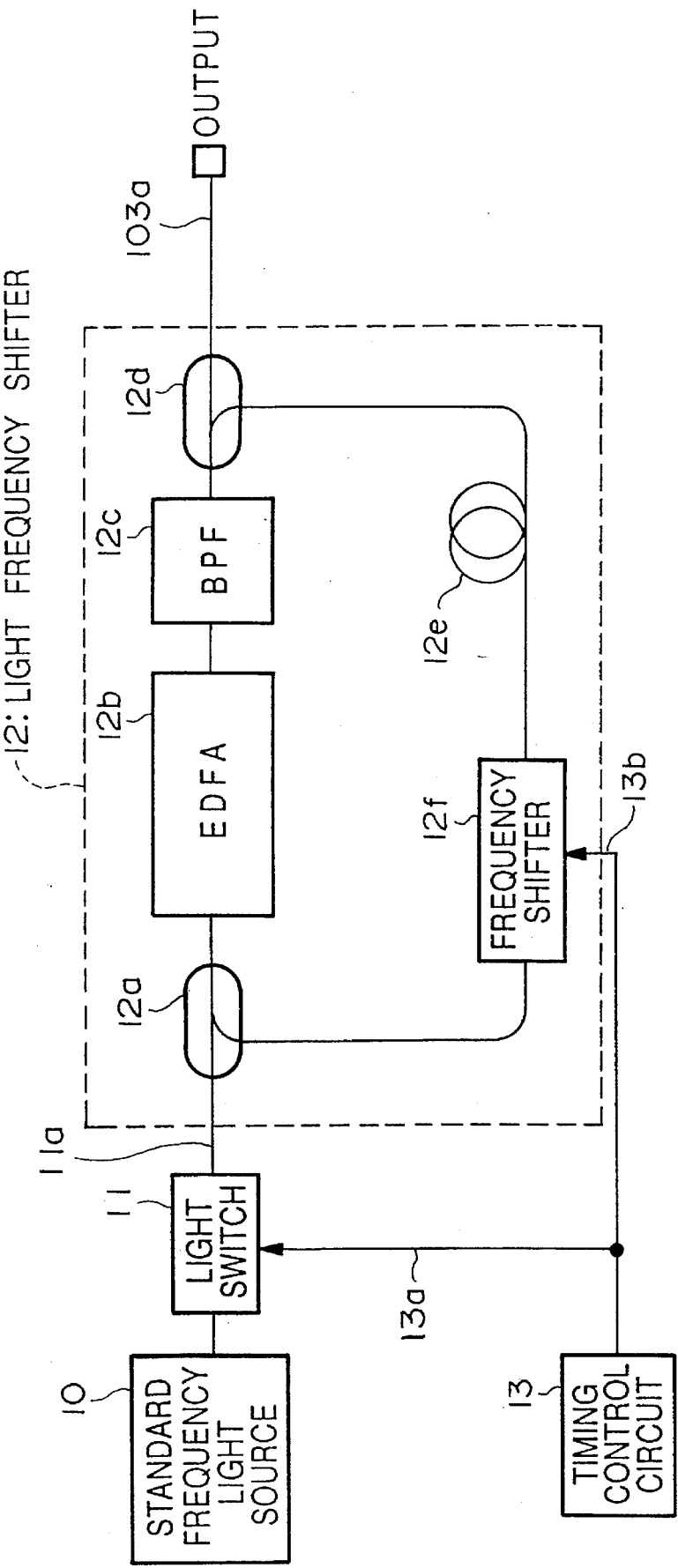
FIG. 6 is a block diagram showing an example of conventional light frequency control device.

In the following, the embodiments of the present invention will be explained with reference to the figures.
First Embodiment
FIG. 1 is a block diagram showing a first embodiment of the present invention. In this figure, portions corresponding to those shown in FIG. 6 will be denoted by the same numbers, and their explanations will be omitted. In this figure, as standard frequency light source 10, a semiconductor laser diode, such as a DFB.LD with a 1.55 μm band which is equipped with ATC (automatic temperature control) and AFC (automatic frequency control), is employed. In the aforementioned AFC, the wavelength of the laser is fixed at 1551.177 nm by means of the acetylene absorption cell. In addition, as light switch 11, 2–3 ports of AOM (acoustic optical modulator) are used.

Furthermore, at predetermined cycles, light frequency shifter 102 repeatedly generates a light signal (light pulse sequence) 103a in which the light frequency component takes the form of a staircase at regular time intervals. In the light frequency shifter 102 according to the present embodiment, a 5 nm light band-pass filter is used as BPF 12c, and 2–3 AOM's are employed as frequency shifter 12f. The control frequency of this frequency shifter 12f is set to 120 MHz. As a result, when a light pulse signal passes through frequency shifter 12f, the light frequency therein is shifted to 120 MHz.

Figure 2:
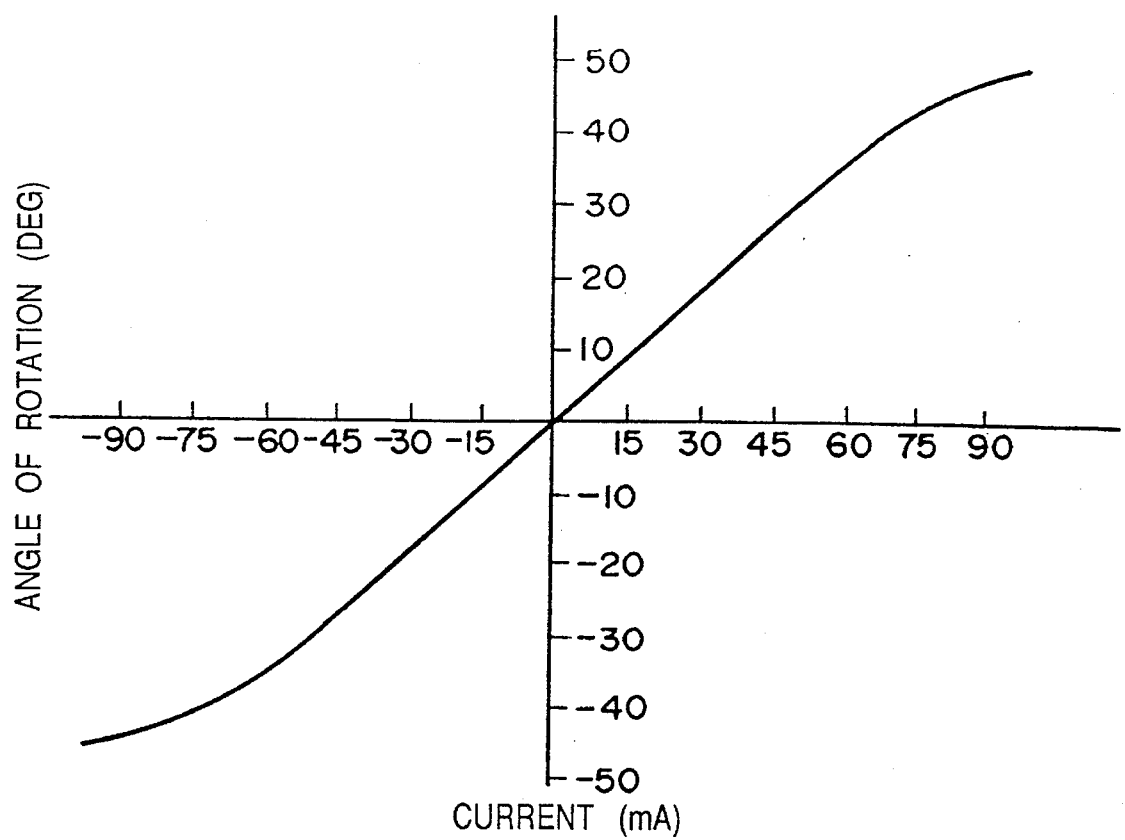
FIG. 2 is a diagram displaying the relationship between the angle of rotation of the plane of polarization of a Faraday rotating component 102g and the current according to the same embodiment.

In addition, in the light frequency shifter 102 shown in FIG. 1, a Faraday rotating component 102g, which serves as a polarization controller, is provided between delay fiber 12e and frequency shifter 12f. This Faraday rotating component 102g possesses a structure in which a garnet crystal is surrounded by a coil: when current flows through this coil, the plane of polarization of the incident light is rotated. The characteristics of this Faraday rotating component 102g, i.e., the relationship between the angle of rotation of the plane of polarization and the current, are shown in FIG. 2. As shown in this figure, the angle of rotation of the plane of polarization changes with increasing current flowing through the coil. In other words, the plane of polarization of the transmitted light is controlled by rotating the plane of polarization of the incident light by means of passing current through the coil.

In FIG. 1, a light coupler 103 is provided which outputs a light signal (light pulse sequence) 103a outputted from light frequency shifter 102, and supplies a portion therein to an interference-type etalon filter 104. This etalon filter 104 possesses an FSR of 100 GHz, and a Δv (half-band width) of 1200 MHz. The doubling of the wavelength is under temperature control. Etalon filter 104 outputs a signal 104a in the second-half portion of the first cycle of light signal (light pulse sequence) 103a, and supplies this signal to optical receiving circuit 105. Optical receiving circuit 105 converts this light signal extracted by means of etalon filter 104 into an electronic signal and supplies this signal to amplifier 106.

Amplifier 106 amplifies this aforementioned signal 104a. Signal extracting circuit 107 extracts a signal supplied from amplifier 106, i.e., one random pulse from among the signals 104a of the second-half portions of signals circulating in light frequency shifter 102, as signal 107a based on the timing signal supplied from timing control circuit 13. In addition, standard power source 108 generates a standard voltage, and outputs this voltage as a standard signal. Level comparator 109 compares the aforementioned signal 107a with the standard signal outputted from standard power source 108, and generates a differential signal expressing the difference between these signals. Arithmetic circuit 110 generates a control signal based on this differential signal outputted from level comparator 109. Furthermore, driving circuit 111 controls the current flowing to Faraday rotating component 102g based on the control signal supplied from arithmetic circuit 110.

Figure 3:
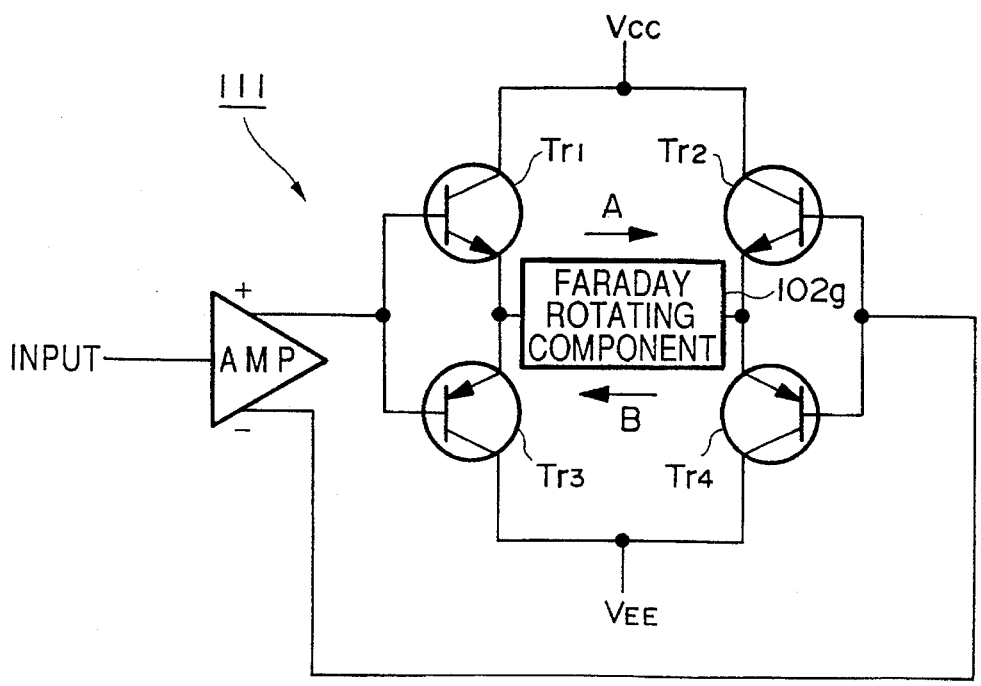
FIG. 3 is circuit diagram showing a driving circuit 111 and a Faraday rotating component 102g according to the same embodiment.

An example of the aforementioned driving circuit 111 is shown in FIG. 3. As shown in this figure, driving circuit 111 is constructed from amplifier AMP, NPN transistors Tr1 and Tr2, and PNP transistors Tr3 and Tr4. One output terminal of amplifier AMP is connected to the bases of NPN transistor Tr1 and PNP transistor Tr3, while the other output terminal of amplifier AMP is connected to the bases of NPN transistor Tr2 and PNP transistor Tr4. In addition, a supply voltage $V_{CC}$ is applied to the collectors of NPN transistors Tr1 and Tr2, while the collectors of PNP transistors Tr3 and Tr4 are grounded. Furthermore, the emitters of NPN transistors Tr1 and Tr2, and PNP transistors Tr3 and Tr4 are respectively connected to Faraday rotating component 102g.

When NPN transistor Tr1 and PNP transistor Tr4 are turned ON by means of the output of amplifier AMP, a current is generated in the direction of arrow A. On the other hand, when NPN transistor Tr2 and PNP transistor Tr3 are turned ON by means of the output of amplifier AMP, a current is generated in the direction of arrow B.

In addition, in FIG. 1, timing control circuit 13 respectively outputs timing signal 13a to light switch 11 and timing signal 13b to frequency shifter 12f. Furthermore, timing control circuit 13 supplies a constant timing signal to signal extracting circuit 107, and in turn, signal extracting circuit 107 outputs this timing signal 107a.

Figure 4:
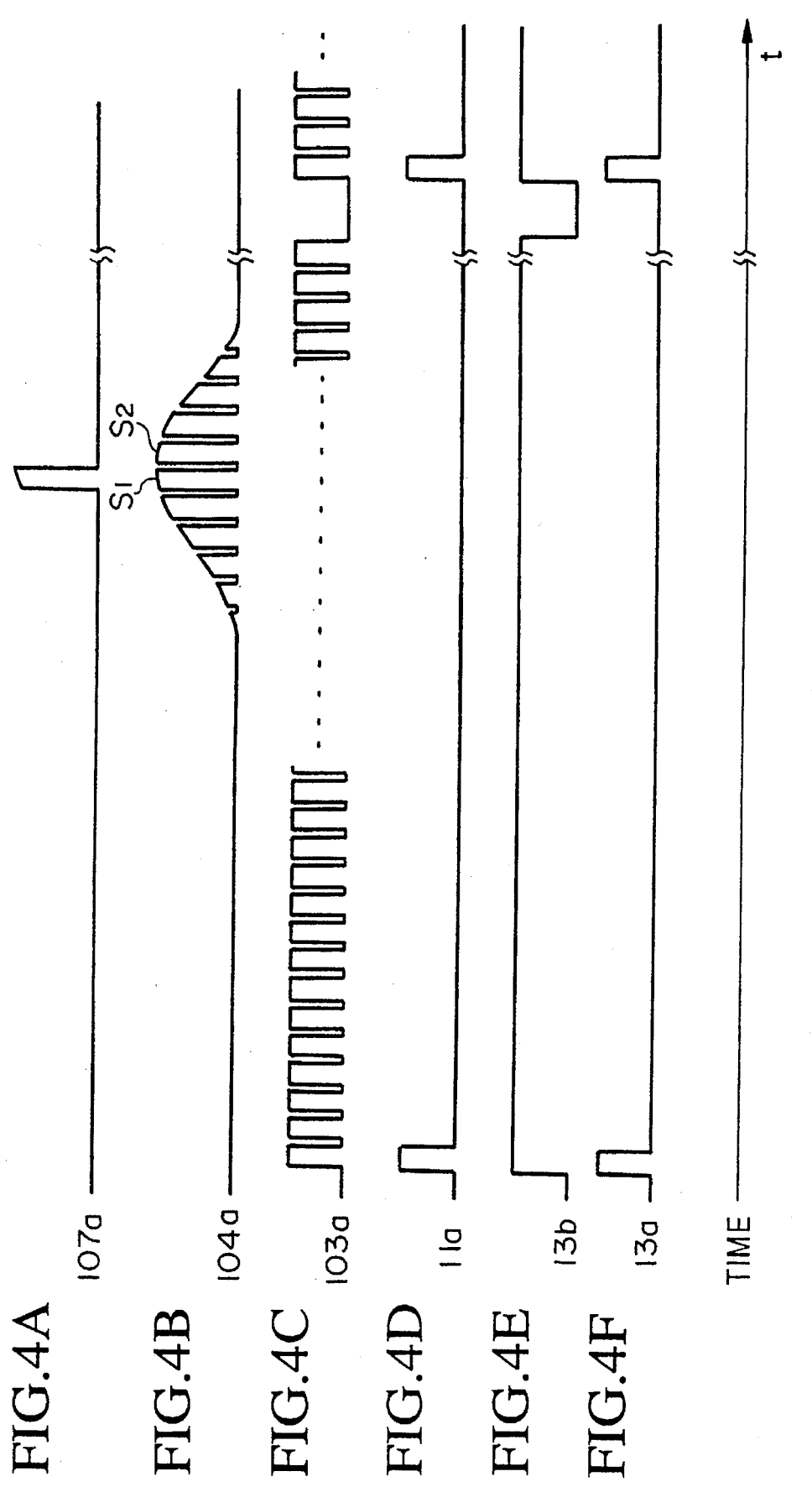
FIG. 4(a) through FIG. 4(f) are a block diagrams showing a signal 107a illustrating the relationship of frequency over time FIG. 4(a); the variation 104a of the frequency axis FIG. 4(b); light signal (light pulse sequence) 103a FIG. 4(c); light pulse signal 11a FIG. 4(d); the timing of timing signal 13b FIG. 4(e), and the timing of timing signal 13a FIG. 4(f), according to the same embodiment.

In the following, the operation of the light frequency control apparatus according to the aforementioned structure will be explained with reference to FIGS. 1–4. FIG. 4(a) FIG. 4(f) are diagrams showing the timing of each signal. By means of the output of a timing signal 13a as shown in FIG. 4(f) from timing control circuit 13, light switch 11 switches CW light supplied from standard frequency light source 10 in response to this timing, and outputs the aforementioned as light pulse signal 11a shown in FIG. 4(d). This light pulse signal 11a is supplied to light frequency shifter 102, and circulates in a loop constructed by means of light coupler 12a through frequency shifter 12f. This signal is then supplied to light coupler 12a as a feedback light signal, and circulates in a loop for a predetermined number of times thereafter. While this light signal circulates within the aforementioned loop, the frequency therein is sequentially shifted by means of a frequency shifter. As a result, a light signal (light pulse sequence) 103a as shown in FIG. 4(c) is outputted from light coupler 12d.

This light signal (light pulse sequence) 103a is outputted from light frequency shifter 102 and supplied to etalon filter 104 via light coupler 103. In this manner, a signal 104a of the second-half portion in the first cycle of light signal (light pulse sequence) 103a is outputted from etalon filter 104. An example of this signal 104a is shown in FIG. 4(b). As described above, in light frequency shifter 102, due to the use of a 5 nm BPF 12c, it is possible to shift the frequency component of the light pulse sequence to 100 GHz (approximately 833 cycles) or greater than the standard frequency. In addition, this signal 104a is amplified in amplifier 106, and then supplied to signal extracting circuit 107. Signal extracting circuit 107 extracts one random pulse shown in FIG. 4(a) (e.g., pulse S1) based on the constant timing supplied from timing control circuit 13, and outputs this pulse as signal 107a. This signal 107a is compared with the standard signal of standard power source 108 in level comparator 109, and a differential signal expressing the difference therein is then supplied to arithmetic circuit 110. The standard voltage of this standard power source 108 is then set to the same value as the output voltage of signal 107a corresponding to the optimal polarization state.

In light frequency shifter 102, during rotation of the plane of polarization, a large differential signal results due to the attenuation of the level of the aforementioned pulse S1. A control signal is then formed in arithmetic circuit 110 in response to this differential signal. Consequently, this control signal corresponds to the deterioration of the S/N ratio from the polarization dependency in light frequency shifter 102. Based on this control signal, driving circuit 111 controls the current value of the current flowing to Faraday rotating component 102g, and also controls the depolarization state of the loop within light frequency shifter 102. In this manner, the polarization dependency within the loop is corrected, and the polarization dependency of light frequency shifter 102 is reduced.

Second Embodiment

Figure 5:
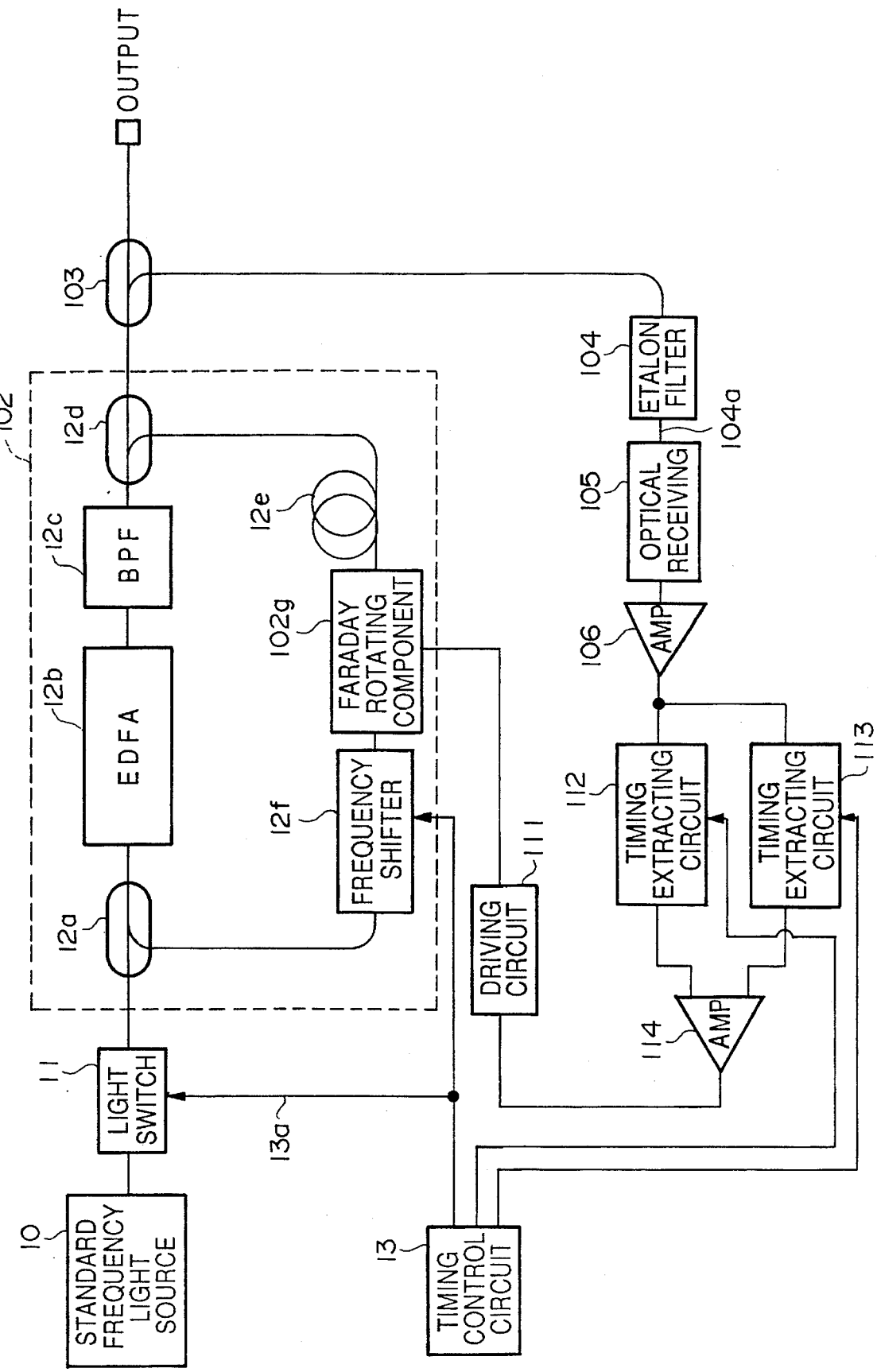
FIG. 5 is a block diagram showing a construction of a light frequency control apparatus according to a second embodiment of the present invention.

FIG. 5 is a block diagram showing a construction of a light frequency control apparatus according to a second embodiment of the present invention. In this case, timing extracting circuits 112 and 113, and amplifier 114 are inserted in between amplifier 106 and driving circuit 111. A predetermined timing signal is supplied to each timing extracting circuit 112 and 113 from timing control circuit 13. The timing of this timing signal is set to a portion of signal 104a undergoing little change, e.g., the timing of pulse S1 and pulse S2.

These timing extracting circuits 112 and 113 then supply a signal supplied from amplifier 106 according to each timing signal, in other words, from among the second-half portions of signals circulating in light frequency shifter 102, e.g., extract and supply pulse S1 and pulse S2, respectively, to differential amplifier 114. Differential amplifier 114 then supplies a control signal corresponding to the difference between the signal supplied from timing extracting circuit 112 and the signal supplied from timing extracting circuit 113 to driving circuit 111.

In this type of structure, the light signal is attenuated due to the polarization dependency within the loop during circulation. Consequently, the attenuation amount, i.e., the approximate deterioration of the S/N ratio from the polarization dependency is determined by means of comparing the levels of the two light signals in the second-half of their respective cycles using differential amplifier 114. Subsequently, driving circuit 111 controls the current flowing to the coil of Faraday rotating component 102g by means of a control signal in a manner such that the level difference between the aforementioned pulse S1 and pulse S2 is eliminated. In this manner, the polarization state of the loop within light frequency shifter 102 is controlled.

In the past, the polarization dependency of the light frequency shifter differed based on the delay fiber and the character of the frequency shifter (AOM), thereby resulting in an unstable S/N ratio of the light signal (light pulse sequence). In contrast, according to the aforementioned embodiments, by means of controlling the current flowing to Faraday rotating component 102g, it is possible to control the polarization of light frequency shifter 102, fix the S/N ratio of the light signal (light pulse sequence) 103a, stabilize the properties of light frequency shifter 102, and increase the number of cycles therein.

Results of the Invention

According to the present invention, when shifting the light frequency of a light pulse signal to form a staircase state at regular intervals, it is possible to restrict the influence from the polarization dependency of the light frequency shifting mechanism to a minimum level by means of providing in a light frequency control apparatus comprising a light pulse signal generating mechanism for generating a light pulse signal of a standard frequency; and a light frequency shifting mechanism for circulating the aforementioned light pulse signal a predetermined number of times and delaying this light pulse signal at each cycle, thereby sequentially shifting and outputting this light pulse signal; an extracting mechanism for extracting a light pulse signal in the second half of a cycle from the output of the light frequency shifting mechanism and a polarization control mechanism inserted into the light frequency shifting mechanism for controlling the angle of polarization of the light pulse signal circulating in this light frequency shifting means based on the amount of attenuation of the light pulse signal outputted by means of the extracting mechanism. Consequently, it is possible for the light frequency shifting mechanism to conduct a stable frequency shift over a wide range, and also increase the number of cycles of a light pulse signal thereby producing a stable light pulse signal.

What is claimed is:

1. A light frequency control apparatus comprising:

light pulse signal generating means for generating a light pulse signal of a standard frequency;

light frequency shifting means, including a light coupler, a light amplifier, a band pass filter, a delay fiber, and a light frequency shifter, for circulating said light pulse signal a predetermined number of cycles, and delaying said light pulse signal at each said cycle, thereby sequentially shifting and outputting said light pulse signal at an output of the frequency shifting means;

extracting means for extracting said light pulse signal in the second half of each said cycle responsive to said light pulse signal output from said light frequency shifting means;

a timing control circuit for switching the standard frequency light source in response to a timing signal, and for supplying the timing signal to said light frequency shifter and to the extracting means for controlling the timing of light pulse signal; and a Faraday rotating component connected to the input of said light frequency shifter and coupled to the output of said delay fiber serving as a polarization controller for controlling the angle of polarization of said light pulse signal circulating in said light frequency shifting means based on the amount of attenuation of said light pulse signal output by said extracting means which reduces the attenuation of the circulating light pulse signal so that said light frequency shifting means increases the number of circulating cycles of a light signal and produces stable high frequency light signals.

2. A light frequency control apparatus comprising:

light pulse signal generating means for generating a light pulse signal of a standard frequency;

light frequency shifting means, including a light coupler, a light amplifier, a band pass filter, a delay fiber, and a light frequency shifter, for circulating said light pulse signal a predetermined number of times, and delaying said light pulse signal at each cycle, thereby sequentially shifting and outputting said light pulse signal at an output of the frequency shifting means; and polarization control means including extracting means, including an extracting circuit, for extracting said light pulse signal in the second half of a cycle from said output of said light frequency shifting mean, a Faraday rotating component, disposed between said light frequency shifter and said delay fiber, for supplementing the polarization angle of the light pulse signal in order to reduce the attenuation of the circulating light pulse signal so that said light frequency shifting means increases the number of circulating cycles of a light signal and produces stable high frequency light signals, a driving section for driving said Faraday rotating component, including a light coupler, an etalon filter, an optical receiving circuit, a level comparator, an arithmetic circuit and a driving circuit, wherein the light pulse signal output from said light frequency shifter through said light coupler and said etalon filter is converted into electronic signals by said optical receiving circuit, and then compared with the standard frequency signal generated by a power source by said level comparator to obtain a differential signal, said differential signal being converted by said arithmetic circuit into a positive or negative current by the driving circuit to be delivered to said Faraday rotating component.

* * * * *